United States Patent [19]
Kiuchi et al.

[11] Patent Number: 5,392,024
[45] Date of Patent: Feb. 21, 1995

[54] COLLISION DETECTION SYSTEM

[75] Inventors: Toru Kiuchi, Mishima; Kenji Ogata, Susono; Masakazu Chiba, Aichi; Makoto Shiota, Susono, all of Japan

[73] Assignee: Toyota Jidosha Kabushiki Kaisha, Toyota, Japan

[21] Appl. No.: 897,750

[22] Filed: Jun. 12, 1992

[30] Foreign Application Priority Data

Jun. 14, 1991 [JP] Japan .................. 3-169333
Dec. 16, 1991 [JP] Japan .................. 3-351710
Dec. 17, 1991 [JP] Japan .................. 3-353455

[51] Int. Cl.⁶ .............................. B60Q 1/00
[52] U.S. Cl. .................. 340/436; 340/901; 340/903; 340/665; 280/735; 307/10.1
[58] Field of Search ............ 340/436, 437, 901, 903, 340/438, 665; 280/734, 735; 307/9.1, 10.1

[56] References Cited

U.S. PATENT DOCUMENTS 3,812,312  5/1974  Andersen et al. ............ 200/61.53
3,859,482  1/1975  Matsui et al. ............... 200/61.08
4,966,388  10/1990 Warner et al. ............... 280/730

FOREIGN PATENT DOCUMENTS 0305655   6/1989   European Pat. Off. .
57-53953  9/1955   Japan .
3112455   11/1991  Japan .
1356178   6/1974   United Kingdom .
1380968   1/1975   United Kingdom .
2225660   6/1990   United Kingdom .

OTHER PUBLICATIONS

WO90/10302, Sep. 7, 1990 (Automotive Technologies International, Inc.) Breed, D. S. et al.

*Primary Examiner*—Donnie L. Crosland
*Attorney, Agent, or Firm*—Cushman, Darby & Cushman

[57] ABSTRACT

A collision detection system utilizing a set of primary sensors and a secondary sensor. When a sufficient collision load is applied to the sensors, the sensors output a signal. The primary sensors are constructed to be more sensitive than the secondary sensor. Based on the outputs of the primary and secondary sensors, a control unit detects the collision. Upon detecting the collision, the control unit outputs a collision detection signal which activates a protection device, such as an air bag.

19 Claims, 8 Drawing Sheets

| | PRIMARY SENSOR (1ST) | PRIMARY SENSOR (2ND) | SECONDARY SENSOR | IGNITER |
|---|---|---|---|---|
| I | OFF | OFF | OFF | OFF |
| II | ON | OFF | OFF | OFF |
| III | ON | ON | OFF | ON |
| IV | ON | OFF | ON | ON |
| V | OFF | OFF | ON | ON |

COLLISION DETECTION SYSTEM

BACKGROUND OF THE INVENTION

1. Field of the Invention

The present invention relates to a collision detection system for detecting a collision of a vehicle to output a signal for actuating a device carried on the vehicle.

2. Description of the Prior Art

An air bag, which is expanded in a vehicular compartment to protect the passenger when the vehicle has its front or side hit by another vehicle, is inflated with the inert gas which is generated by an inflater forming part of an air bag type protecting system. Especially in an electric air bag system, a gas producing agent in the inflater is ignited in response to a signal which is outputted when a collision is detected by a collision sensor arranged in a predetermined portion of the vehicle body. Then, the air bag is instantly expanded by a large quantity of gas generated abruptly as a result of the ignition to extend into a space between the driver and the steering wheel, between the assistance driver and the dashboard, or between a passenger in another seat and the compartment's side wall such as the inner face of the side door thereby to protect the passenger against the so-called "secondary collision".

In case of this side collision, therefore, the amount of impact absorption is less due to the structural restriction of the vehicle body than in case of the front collision so that the expansion of the air bag has to be completed for a seriously short time. This makes it necessary to mount a collision sensor of high sensitivity in such a portion of the body as can detect the collision most quickly.

For example, FIG. 14 shows a system exemplifying the air bag system of the prior art for protection against a side collision, as disclosed in U.S. Pat. No. 4,966,388. In this system, a collision sensor 1 is attached to either the inside of the outer panel 3 of a side door 2 of a vehicle or a flat plate 4 arranged in the side door 2. This collision sensor 1 is of contact type or pressure sensitive type for detecting a side collision when compressed at the time of a collision together with the member carrying it. If the side collision is detected, the sensor 1 outputs an ignition signal to ignite an inflater 5 so that an air bag 6 is inflated with the much gas generated by the inflater 5, to extend in the space between a passenger 7 and the inner face of the side door 2. Thus, the passenger 7 can have his head 8 or the like protected against the secondary collision against the side wall of the compartment.

As described above, the side collision sensor 1 of the prior art is attached to such a portion in the side door 2 as can detect the side collision most easily. The side collision sensor 1 is crushed, for example, by a load, which is caused by the deformation of the side door 2 due to the side collision, to have its paired contacts connected to output the ignition signal for expanding the air bag.

Here, the patterns to be conceived as the side collision of the vehicle are classified into: side collisions generally at a right angle, as shown in FIG. 16; oblique collisions at an angle, as shown in FIG. 15; and local collisions against obstacles such as telegraph poles. The manners for the load to be applied from the collisions are different in the patterns. In case the side door is hit generally at a right angle by the head of another vehicle, for example, the area to receive the load is widened to decrease the collision load per unit area. In case, on the other hand, the side door is hit by a slender obstacle such as a telegraph pole, the load per unit area is high although the area to receive the load is small and the total load is low. These various kinds of collisions have to be detected without fail by the aforementioned collision sensor 1 of the air bag system for protection against a side collision. It is, therefore, the current practice that the collision sensor 1 of high sensitivity is attached to such a portion, e.g., inside of the outer panel 3 of the side door 2 or on the flat plate 4 in the door as can detect the side collision relatively easily.

SUMMARY OF THE INVENTION

A major object of the present invention is to detect a collision highly sensitively while preventing any malfunction when in a normal run with no collision.

Another object of the present invention is to detect an oblique collision from the front or back without fail.

Still another object of the present invention is to prevent the malfunction when in the normal run while narrowing the range of no detection of the collision.

According to a feature of the present invention, therefore, there is provided a collision detection system for detecting a collision of a vehicle to output a collision detection signal thereby to actuate a device carried on the vehicle, which system comprises: a plurality of primary sensors for outputting signals individually if pressed as a result of the collision of the vehicle; a secondary sensor for outputting a signal after said primary sensors if pressed as a result of the collision; and a control unit for outputting said collision detection signal if the signals of said primary sensors satisfy a predetermined condition or if said secondary sensor outputs its signal.

According to another feature of the present invention, there is provided a collision detection system including a plurality of collision sensors arranged at a predetermined interval for outputting a collision detection signal, if at least two of said collision sensors detect a collision of a vehicle, to actuate a device carried on the vehicle, which system comprises: signal hold means for holding the signal, which is outputted by such one of said collision sensors as has detected the vehicular collision at first, for a constant time period; and a control unit for outputting said collision detection signal if another of said collision sensors detects a collision to output its signal while the first signal is being held.

According to a further feature of the present invention, there is provided a collision detection system for detecting a collision a vehicle to output a collision detection signal thereby to actuate a device carried on the vehicle, which system comprises: a plurality of collision sensors arranged close to each other in a portion of a vehicle body, to which a collision load is applied at an initial stage of the collision, for outputting signals if pressed; and a control unit for outputting said collision detection signal by detecting the collision if at least two spaced ones of said collision sensors output their signals individually.

The above and further objects and novel features of the present invention will more fully appear from the following detailed description when the same is read in connection with the accompanying drawings. It is to be expressly understood, however, that the drawings are for the purpose of illustration only and is not intended as a definition of the limits of the invention.

DESCRIPTION OF THE PREFERRED EMBODIMENTS

A collision detection system according to the present invention will be specifically described with reference to the accompanying drawings.

FIGS. 1 to 8 show a first embodiment of the present invention. An air bag system for protection against a side collision of a vehicle has its air bag arranged either in a side door of the vehicle or in a center pillar or. arm rest in the compartment of the vehicle, although not shown.

Figure 2:
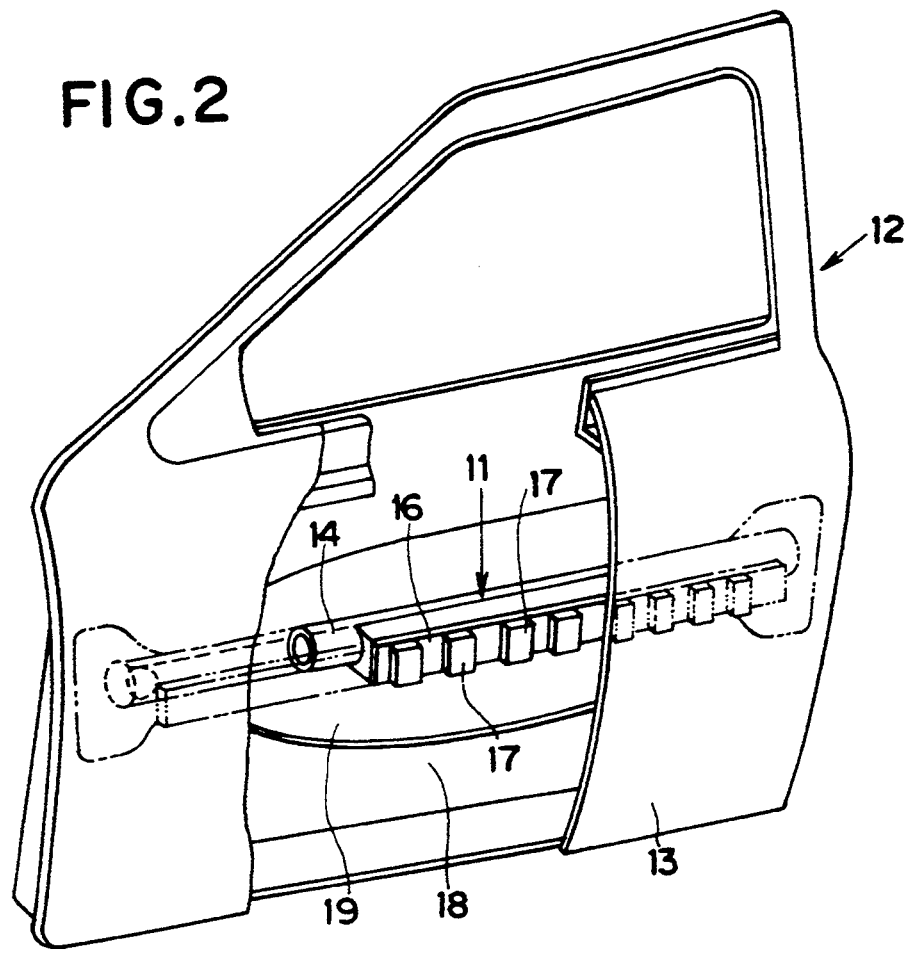
FIG. 2 is a partially cut-away perspective view of a side door and shows the arrangement of the collision sensors.

In this air bag, a signal for igniting a not-shown inflater if a collision sensor 11 arranged at a predetermined position in the side of the vehicle body detects a side collision. This collision sensor 11 is integrally attached through a spacer 15 to a side door beam 14, which is arranged generally horizontally just inside of an outer panel 13 of a side door 12, and is interposed between the outer panel 13 and the side door beam 14, as shown in FIG. 2.

Figure 1:
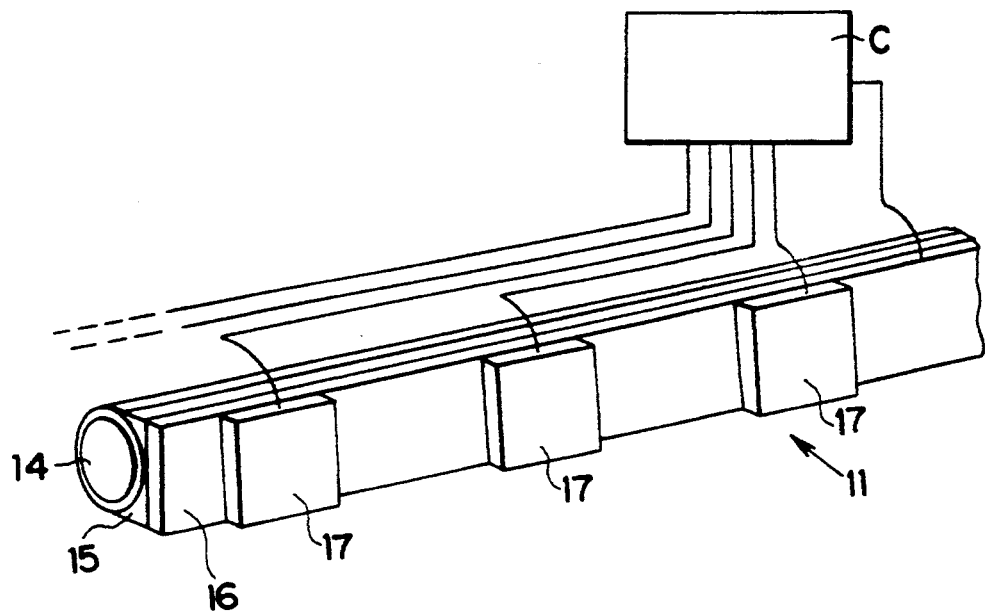
FIG. 1 is a perspective view showing the state, in which a collision detection system according to the present invention has its collision sensors attached to a side door beam.
Figure 3:
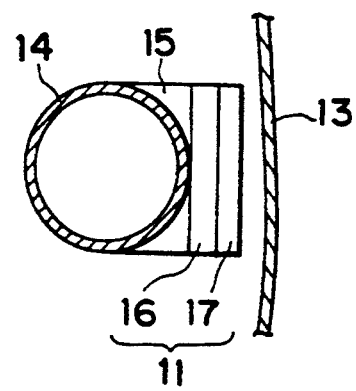
FIG. 3 is a section showing the state, in which the collision sensors are attached to the side door beam.
Figure 4:
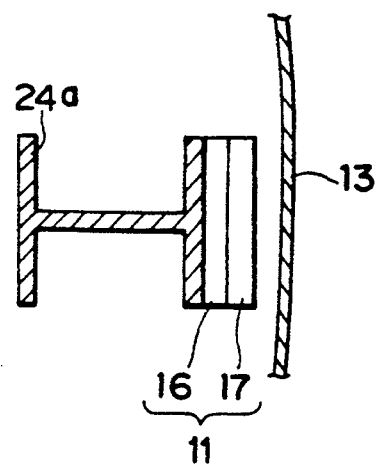
FIG. 4 is section showing the state, in which the collision sensors are attached to another side door beam.

As shown in FIG. 1, moreover, the collision sensor 11 is composed mainly of an elongated secondary sensor 16 having a shape of thin rectangular pipe, and primary sensors 17 which are made by cutting short a thin rectangular pipe having a generally identical section but a lower rigidity. To one side of the highly rigid side door beam 14 having a circular section, there are irrotationally attached through the spacer 15 the elongated secondary sensor 16, to the outer side of which the primary sensors 17 are attached at a constant interval. Moreover, a small space is left between the primary sensors 17 and the outer panel 13, as shown in FIG. 3. Since the elongated secondary sensor 16 having a considerable rigidity is extended along the side beam 14, the side door beam 14 can have a light weight because the strength required of it can be reduced.

Moreover, the primary sensors 17 are exemplified by sensors of highly sensitive type, which can be crushed, even if clamped by a relatively weak force, to have their internally opposed contacts (although not shown) connected and turned on. On the other hand, the secondary sensor 16 is exemplified by a sensor having a slightly lower sensitivity, which is likewise crushed to have its (not-shown) contacts connected and turned on if it is clamped by a constant or stronger force than that for turning on the primary sensors 17. These primary sensors 17 are superposed on the secondary sensor 16. In this state (as shown in FIG. 1), the side door beam 14 is arranged in a generally horizontal position by inserting it into the side door 12 from an opening 19 formed in an inner panel 18 of the side door 12 and by fixing its two ends on reinforcing members at the two sides of the side door 12 by means of bolts such that the collision sensor 11 is positioned at the side of the outer panel 13.

On the other hand, the collision sensor thus arranged is adapted to output a collision detection signal or not in accordance with the ON/OFF states of the primary sensors 17 and the secondary sensor 16. For this operation, the collision sensor 11 is equipped with a control unit C which is connected with the primary sensors 17 and the secondary sensor 16. Here, the combinations of the ON/OFF states of the individual sensors 17 and 16 for outputting the collision detection signal are tabulated in the map of FIG. 5, as will be clarified in the following operations of the present embodiment.

Incidentally, this embodiment has been described in connection with the case, in which the collision sensor 11 is attached to the side door beam 14 having a circular section through the spacer 15. However, the side door beam can also be exemplified by one 24a which is made of an extrusion molding of aluminum alloy having an H-letter shape in cross-section and having a light weight and a high rigidity. In this modification, the spacer 15 can be omitted, and the collision sensor 11 composed of the primary sensors 17 and the secondary sensor 16 is attached directly to one face of the side door beam 24a at the side of the outer panel 13. Since the collision sensor 11 is thus attached to the highly rigid side door beam 14 or 24a, the primary sensors 17 and the secondary sensor 16 of the collision sensor 11 are crushed at the time of a collision before the side door beam 14 or 24a is deformed, so that the side collision can be detected at an earlier stage.

Next, the operations of the present embodiment constructed as above will be described with reference to FIGS. 6 to 9.

Figures 5, 6:
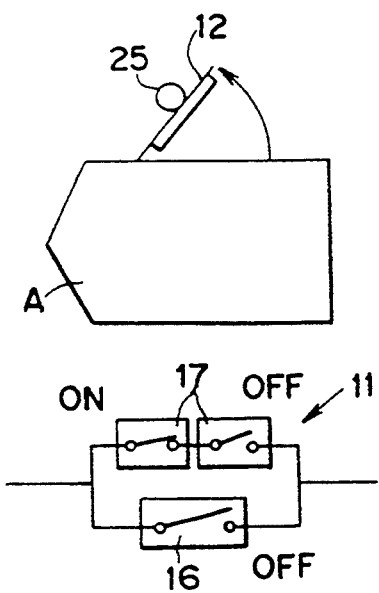
FIG. 5 is a map showing the ON/OFF states of the collision sensors for different collision patterns.
FIG. 6 is an explanatory diagram showing the ON/OFF states of the collision sensors in case the side door collides against a pole when it is opened.

A vehicle such as an automobile A may have its side door 12 colliding erroneously against a pole 25 such as a signpost in a parking zone, when the side door 12 is opened, as shown in FIG. 6. Since the side door 12 is partially clamped by a relatively weak force, the collision sensor 11 carried in the side door 12 have its secondary sensor 16 left OFF. Since, moreover, the hit pole 25 does not have a large diameter, the number of highly sensitive primary sensors 17 turned on is no more than two but one so that the collision is not detected (as in the mode (II) of FIG. 5). As a result, the collision detection is not outputted to leave the air bag uninflated.

Figure 7:
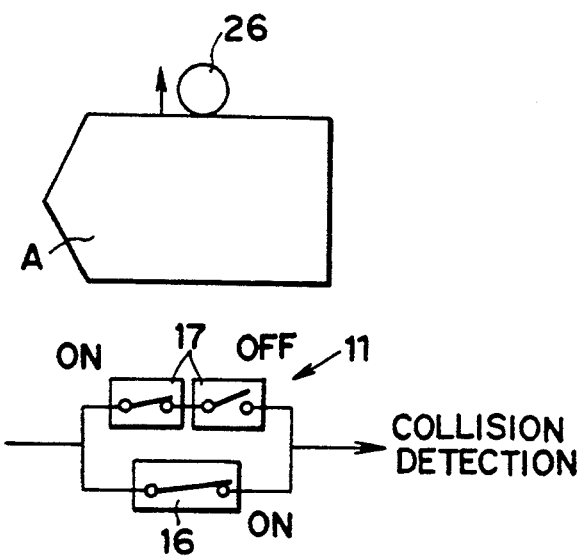
FIG. 7 is an explanatory diagram showing the ON/OFF states of the collision sensors in case the vehicle sideslips and collides against a telegraph pole.

As shown in FIG. 7, on the other hand, the automobile A may spin or slide sideways while running to have its side colliding against a telegraph 26 or the like. Then, a load at a unit area rises so that at least the secondary sensor 16 is turned on. In this instance, any or none of the primary sensors 17 is turned on depending upon the portion, to which the load is applied, (as in the mode (IV) of FIG. 5). Since the secondary sensor 16 is turned on, the collision detection signal is outputted to ignite the inflater. Then, the (not-shown) air confined in the arm rest or the like is instantly inflated with the large quantity of inert gas generated by the inflater, to expand between the passenger in the compartment and the side door 12 thereby to protect the passenger against the secondary collision.

Figure 8:
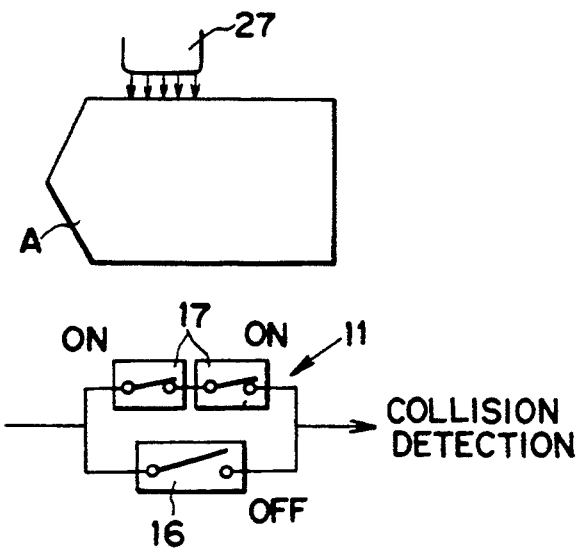
FIG. 8 is an explanatory diagram showing the ON/OFF states of the collision sensors in case the vehicle is hit sideways by another vehicle.

On the other hand, if the running automobile A is hit at its side by another vehicle 27, as shown in FIG. 8, the side of the automobile A has its wide zone hit by the bumper or the like of the vehicle 27. Thus, the collision energy has its load dispersed to crush and turn on the primary sensors 17 individually. As a result, the side collision is detected before the secondary sensor 16 is crushed and turned on (as in the mode (III) of FIG. 5).

Figure 9:
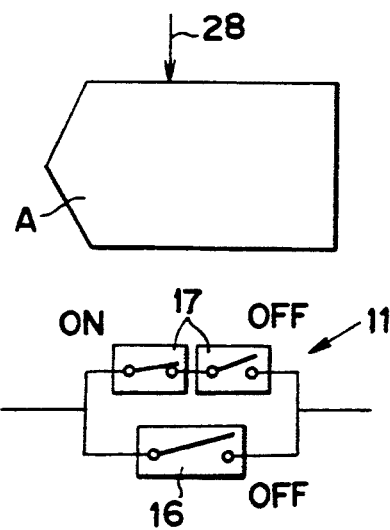
FIG. 9 is an explanatory diagram showing the ON/OFF states of the collision sensors in case the vehicle has its body side kicked.

Moreover, the automobile A being parked may have its side door or its vicinity is locally kicked in play from the outside by an external force 28, as shown in FIG. 9. Then, any of the highly sensitive primary sensors 17 is turned on by the local force, like the case of FIG. 6, but the secondary sensor 16 is left OFF. And, the number of the primary sensors 17 turned on by the local external force 28 is only one. Thus, the predetermined conditions are not satisfied so that the collision is not detected to leave the air bag uninflated (as in the mode (II) of FIG. 5).

Incidentally, the foregoing embodiment has been described in case the collision sensor is attached to the side door beam. However, the collision sensor could be attached to another member such as a member having a relatively high rigidity such as a dent beam, which is arranged close to the inner face of the outer panel of the side door, or a reinforcing member for reinforcing the upper edge portion of the outer panel 13 from the inside. Moreover, the present embodiment has been described in case it is applied to the collision detection system of the air bag system for protection against the side collision. However, the embodiment could be used as the collision detection system of an air bag system which is to be expanded at the time of a head-on collision. Still moreover, the collision sensor has been described in case it is exemplified by the primary sensors 17 and the secondary sensor 16 of touch type, which are crushed to have their contacts connected at the time of a collision. However, sensors of other types could be used, and sensors of different types could be used in combination.

Furthermore, the present embodiment has been exemplified such that one of the conditions for detecting the collision employs two or more ON signals coming from the primary sensors. However, the conditions may be set such that the collision is detected if three or more ON signals or every two ON signals are outputted.

Figure 10:
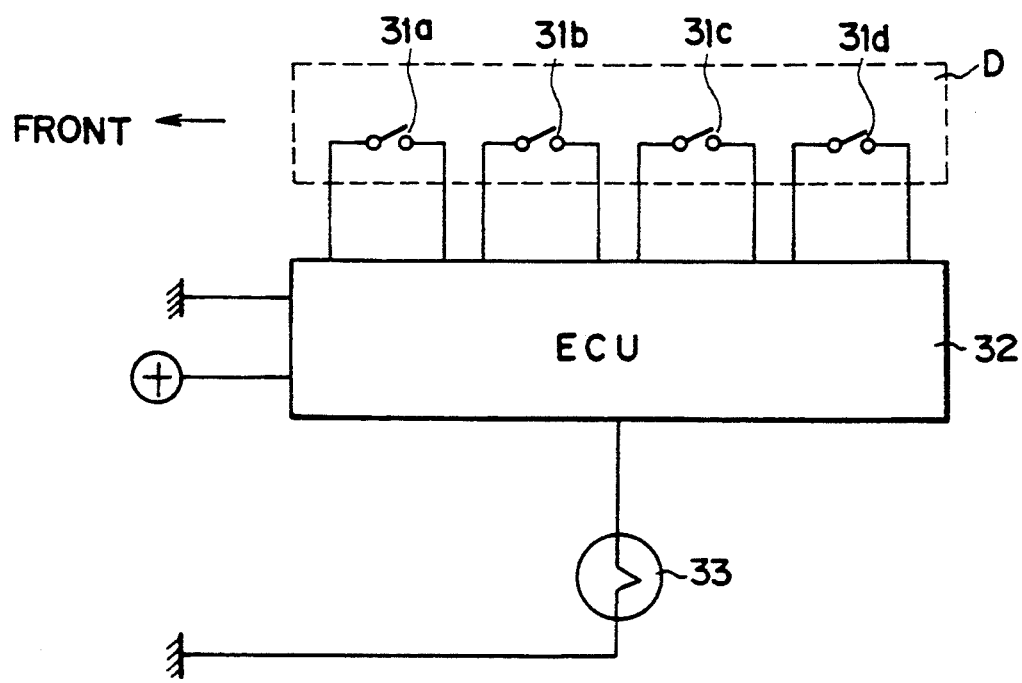
FIG. 10 is a block diagram for explaining the major components of another embodiment.
Figure 12:
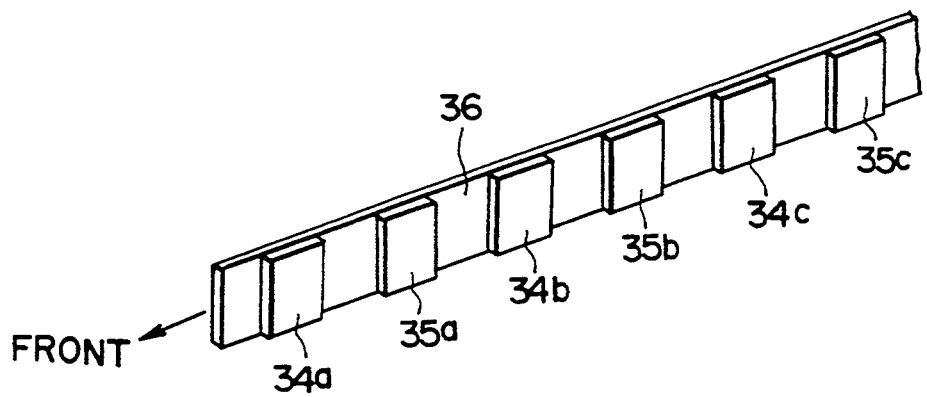
FIG. 12 is an explanatory diagram showing an example of the arrangement of the collision sensors of the embodiment shown in FIG. 11.
Figure 14:
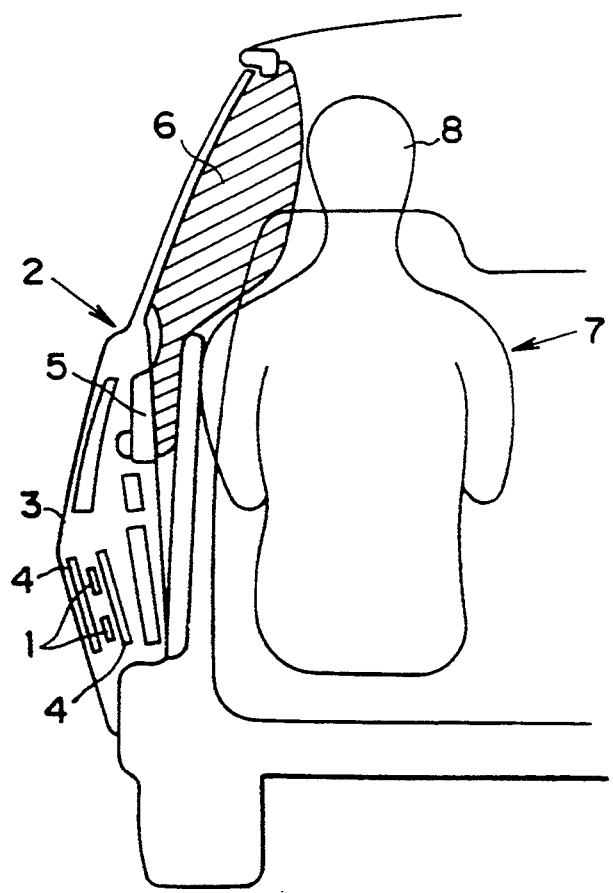
FIG. 14 is a perspective view showing the arrangement of the collision sensors of the side collision air bag of the prior art.

FIGS. 10 and 12 show a second embodiment of the present invention. In a side door D at the side of the automobile body, there are arranged at a predetermined interval from the front (as located at the left-hand side of FIG. 1) of the vehicle body a plurality of collision sensors 31a, 31b, 31c and 31d which have their contacts turned on if crushed by an external force. Moreover, one of the collision sensors 31a, 31b, 31c and 31d transmits a signal to a control unit 32 if it detects the external force.

On the other hand, the control unit 32 is composed of a signal hold circuit and a signal output circuit. If the signal is inputted from one of the collision sensors 31a, 31b, 31c and 31d, the signal hold circuit holds the signal for a constant time period (e.g., about 5 to 15 milliseconds). If one of the remaining collision sensors detects the external force while the signal is being held, its signal is inputted. Then, the control unit 32 takes the state as if the two signals were simultaneously inputted, so that the signal output circuit outputs the collision detection signal to an inflater 33 to ignite it.

Next, the operations of the embodiment thus constructed will be described in the following. If an automobile has its side hit and damaged at a right angle by another automobile while it is running, two or more collision sensors 31a, 31b, 31c and 31d detect the collision simultaneously to output their signals. As a result, these two signals are simultaneously inputted so that the control unit 32 feeds the ignition current to the inflater 33. Then, the air bag is inflated with the nitrogen gas generated by the ignited inflater 33 so that it expands into the space between the inner face of the side door and the passenger to protect the passenger against the secondary collision.

If, on the other hand, an automobile has its body side rubbed obliquely from the front to the back by another automobile, the collision sensors 31a, 31b, 31c and 31d arranged at the predetermined interval are sequentially crushed from the front to the back by the collision load. Thus, the collision sensors detect the external force in the sequential order of 31a, 31b, 31c and 31d from the front. As a result, if the signal is inputted from the collision sensor 31a having detected the external force at first to the control unit 32, it is held for the constant time period in the signal hold circuit of the control unit 32. If the second collision sensor 31b then detects the external force and outputs its signal, this signal is inputted in addition to the signal held in the control unit 32 as if the two signals were simultaneously inputted. As a result, the collision detection signal is outputted from the signal output circuit of the control unit 32 to the inflater 33 to ignite the inflater 33. Then, the nitrogen gas generated by the ignited inflater 33 fills up and inflate the air bag so that the air bag expands in the space between the inner face of the side door and the passenger to protect the passenger against the secondary collision.

Incidentally, the collision sensors 31a, 31b, 31c and 31d used in the present embodiment could be used as the primary sensors in combination with another secondary sensor. Moreover, this embodiment has been described for convenience of description in case it is equipped with the four collision sensors 31a, 31b, 31c and 31d, but the number of collision sensors can be increased or decreased at will.

Figure 11:
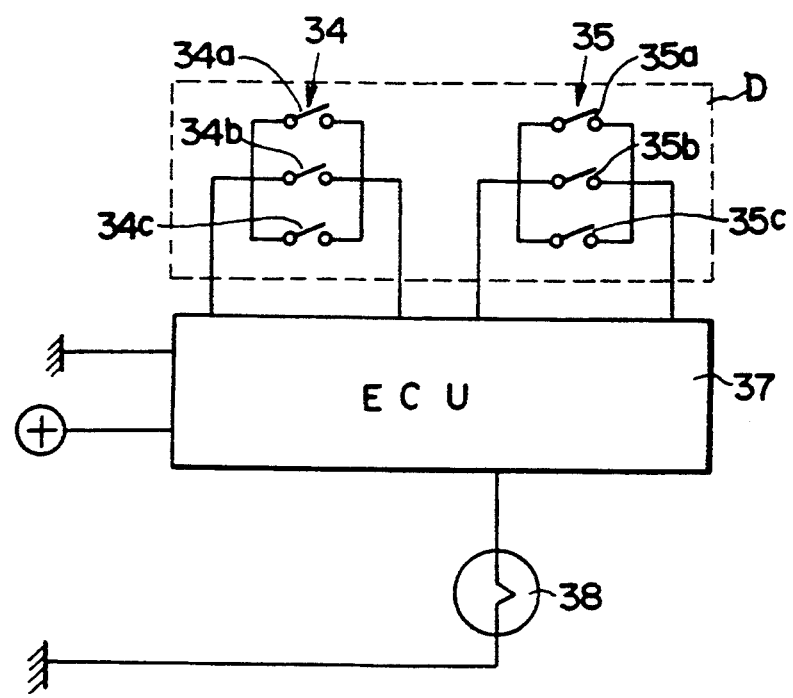
FIG. 11 is a block diagram for explaining the major components of a further embodiment.

On the other hand, FIGS. 11 and 12 show a modification of the second embodiment of the present invention.

In the side door D at the side of the automobile body, there are arranged a plurality of collision sensor groups 34 and 35, of which the former group 34 is composed of three collision sensors 34a, 34b and 34c. These sensors 34a, 34b and 34c are connected in parallel and have their contacts connected, if crushed, to detect an external force. On the other hand, the latter collision sensor group 35 is composed of three collision sensors 35a, 35b and 35c which are likewise connected in parallel. As shown in FIG. 12, moreover, the collision sensors 34a, 35a, - - -, and 34c and 35c are so arranged at a predetermined interval on a mounting flat plate 36 that their adjacent ones belong to the different collision sensor groups 34 and 35. If a signal is inputted from one collision sensor of the individual groups 34 and 35, for example, if the collision sensor 35a detects an external force with a delay after the collision sensor 34a in the front position detects the external force, a control unit 37 holds the signal inputted from the collision sensor 34a for a constant time period. If the collision sensor 35a detects the external force to transmit the second signal while the first signal is being held, the control unit 37 outputs the collision detection signal to an inflater 38 to feed the ignition current. If, on the contrary, the two collision sensors 34a and 34b of the common group 34 output the external force individually to transmit the signals simultaneously, for example, no ignition current is fed from the control unit 37.

If an automobile has its side hit at a right angle with respect to the running direction by another automobile, the different collision sensor groups 34 and 35 of the collision detection system thus constructed according to this modification cause their collision sensors 34a and 35a, for example, to detect an external force simultaneously to output their individual signals. In response to these simultaneous inputs of the two signals, the control unit 37 feds the ignition current to the inflater 38 to ignite it. Then, the air bag is inflated with the nitrogen gas generated from the ignited inflater 38 so that it expands into the space between the inner face of the side door and the passenger, as in the case of the foregoing first embodiment, to protect the passenger against the secondary collision.

If an automobile has its side rubbed obliquely from the front by another automobile, the collision sensors 34a, 35a, 34b, 35b, 34c and 35c arranged at the predetermined interval are crushed sequentially from the front to the back by the collision load to that the collision is detected sequentially from the front in the recited order by the collision sensors 34a, 35a, 34b and 35b. Thus, if the signal is inputted to the control unit 37 from the collision sensor 34a having detected the collision at first, it is held for the constant time period in the control unit 37. If the second collision sensor 35a then detects the collision to output its signal, this second signal is inputted in addition to the first signal held in the control unit 37 as if the two signals were simultaneously inputted. As a result, the control unit 37 feeds the ignition current to ignite the inflater 38. Then, the nitrogen gas generated by the ignited inflater 38 fills up and inflates the air bag so that it expands into the space between the inner face of the side door and the passenger to protect the passenger against the secondary collision.

In this modification, for example, the three collision sensors 34a, 34b and 34c are connected in parallel to constitute the collision sensor group 34 so that the wiring lines between the collision sensors in the side door and the control unit at the side of the automobile body can be drastically reduced.

Incidentally, the foregoing two embodiments have been described in case the present invention is applied to the side collision detection system but could be sufficiently practiced as the head-on collision detection system.

Figure 13:
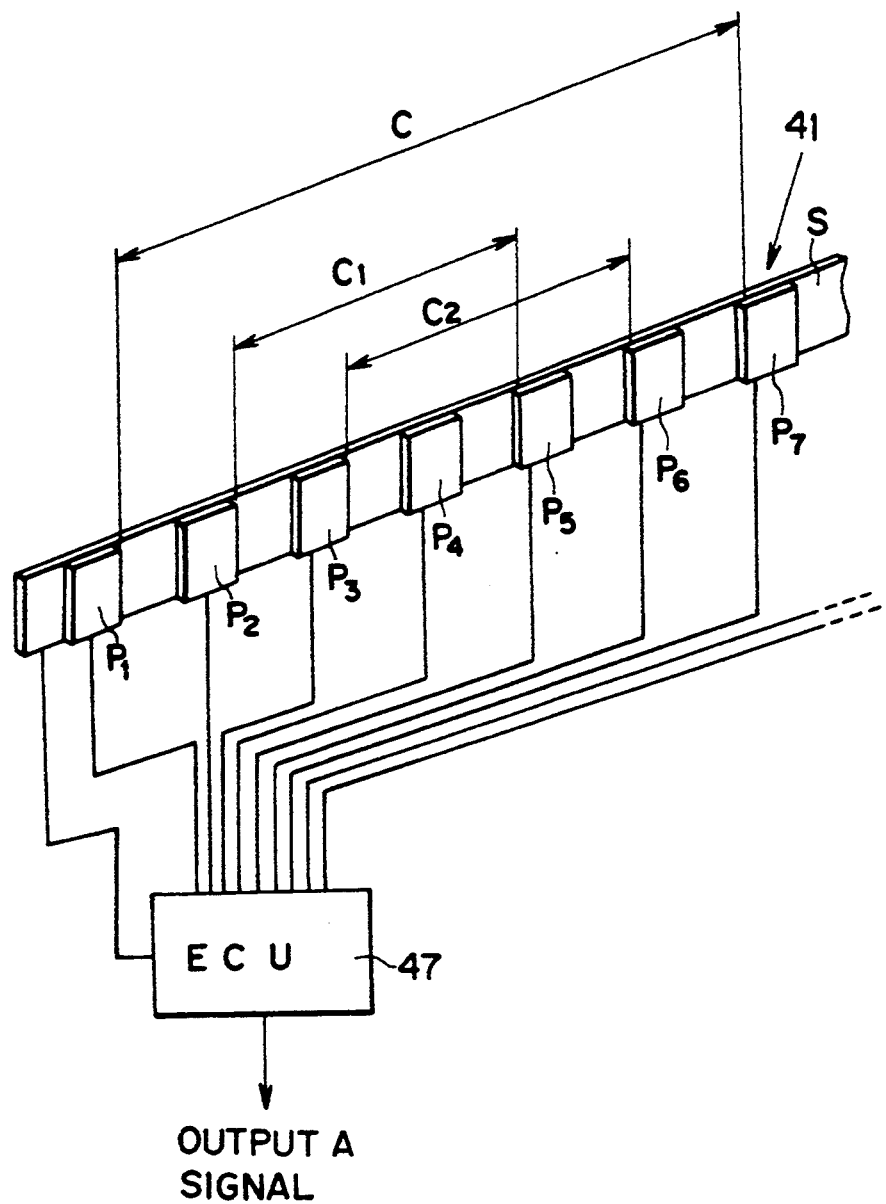
FIG. 13 is a perspective view showing another state, in which the collision sensors are attached to the side door beam.
Figure 15:
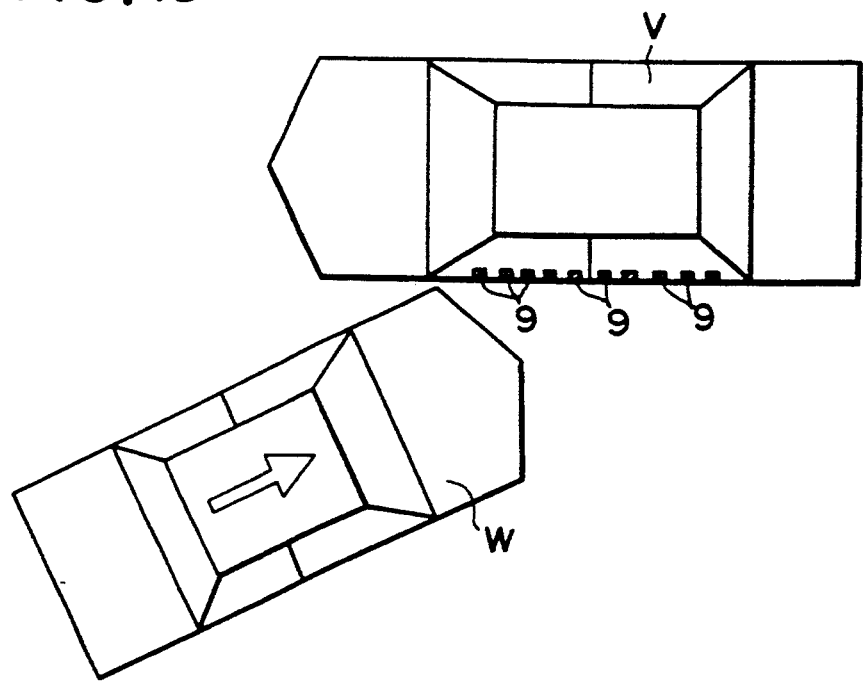
FIG. 15 is an explanatory diagram showing a side collision obliquely from the front.
Figure 16:
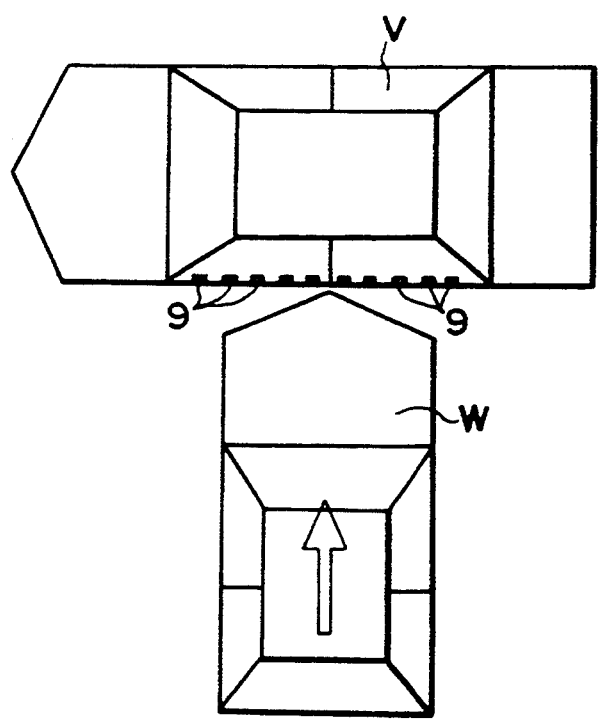
FIG. 16 is an explanatory diagram showing a side collision from just beside.

FIG. 13 shows a third embodiment of the collision detection system according to the present invention. The air bag of the air bag system for protection against the side collision is confined, as in the foregoing embodiments, in either the side door at a side of an automobile body or the arm rest at the side of the automobile body. As in the foregoing embodiments, too, a collision sensor 41 is arranged by attaching it through the spacer to the side door beam between the inner face of the outer panel of the side door and the side door beam extended generally horizontally just inside of that outer panel. Thus, the collision sensor 41 outputs a signal for igniting the inflater if it detects a side collision.

As shown in FIG. 13, moreover, the collision sensor 41 thus arranged is composed of an elongated secondary sensor S having a shape of thin rectangular pipe and a plurality of primary sensors P ($P_1$, $P_2$, - - -, and $P_n$) having a shape of short-cut thin rectangular pipe which has a sectional shape generally identical to that of the secondary sensor S but a lower rigidity. Moreover, the primary sensors P are arranged at a near interval on the side of the secondary sensor S at the outer side of the automobile body. Still moreover, the secondary sensor S carrying the primary sensors P is attached through the spacer to a highly rigid side door beam (although not shown) having a circular shape in cross-section.

Here, the individual primary sensors P are highly sensitive touch sensors which are crushed, even if they are pressed by a relatively weak force, to have their internally opposed contacts (although not shown) connected and turned on. On the other hand, the secondary sensor S is a touch sensor having a slightly lower sensitivity, which is crushed likewise the primary sensors P, if pressed by a force at a level no less than that for turning on the primary sensors P, to have its contacts connected and turned on. Moreover, the primary sensors P are attached by superposing them directly to the surface of the secondary sensor S.

The aforementioned collision sensor 41 is made operative to output or not the collision detection signal in accordance with the ON/OFF states of the primary sensors P and the secondary sensor S and is equipped with a control unit 47 for the operations. Moreover, this control unit 47 is connected with the primary sensors $P_1$, $P_2$, - - -, and $P_n$ and the secondary sensor S. Thus, the collision detection system detects a side collision if at least two non-adjacent ones of the primary sensors P are turned on by a load coming from the side of the automobile body and if at least the secondary sensor S is turned on.

As a result, the insensitive range for the primary sensor $P_4$, as located generally at the center of FIG. 13, is both a range $C_1$ extending from just the front of the adjacent primary sensor $P_5$ to just the back of the primary sensor $P_2$ which is the closest thereto in the non-adjacent state and a range $C_2$ extending from just the back of the adjacent primary sensor $P_3$ to just the front of the primary sensor $P_6$ which is the closest thereto in the non-adjacent state. As a result, the insensitive range C of the prior art of the case, in which the three primary sensors $P_1$, $P_4$ and $P_7$ are arranged at a spacing, can be reduced substantially to one half, while preventing a malfunction to an input from the side other than the collision, by adding the two primary sensors $P_2$ and $P_3$ and the two primary sensors $P_5$ and $P_6$ to the spaces between the individual intervals.

Next, the operations of the present embodiment thus constructed will be described in the following.

If the running automobile has its side hit by another automobile, the collision sensor 41 thus attached to the inside of the side door has its primary sensors P crushed and individually turned on by the dispersed load of the collision energy because the bumper or the like of another automobile collides over a wide range of the side of the hit automobile. As a result, two or more non-adjacent primary sensors P are individually turned on so that the collision detection sensor detects the side collision to cause the control unit 47 to output the collision detection signal to the inflater. In response to this collision detection signal, the inflater is ignited to inflate the side air bag with the gas generated thereby so that the air bag can be expanded into the space between the passenger in the compartment and the side door to protect the passenger against the secondary collision. Moreover, the insensitive ranges $C_1$ and $C_2$ for the individual primary sensors P can be narrowed to improve the reliability of the collision detection system.

If, on the other hand, the running automobile spins or slides sideways to have its die colliding against a telegraph pole or the like, the load per unit area is increased so that at least the secondary sensor S is crushed and turned on. In this case, depending upon the portion receiving the load, any or none of the primary sensors P is turned on, but the secondary sensor S is turned on so that the collision detection system detects the collision to cause the control unit 47 to output the collision detection signal to the inflater. As a result, the side air bag is expanded into the space between the passenger in the compartment and the side door to protect the passenger against the secondary collision.

If, on the other hand, the side door is erroneously hit, when opened in a parking zone or the like, by a pole such as a signpost, the side door locally receives a relatively weak force. In this collision sensor 41, therefore, only the adjacent primary sensors $P_4$ and $P_5$, for example, are turned on, but the secondary sensor S is not turned on while leaving the primary sensors $P_2$, $P_6$ and so on non-adjacent to the primary sensor $P_4$ OFF. As a result, the detection system does not detect any collision so that the air bag is not expanded in the least.

Incidentally, the foregoing embodiment has been described in case the collision sensor is attached to the side door beam, but the sensor could be attached to another member at the side of the automobile body, such as the dent beam or reinforcing member having a relatively high rigidity. Moreover, this embodiment has been described in case the primary sensors P are arranged on the surface of the secondary sensor S. However, the primary sensors P could be attached directly to the side door beam or the like and arranged separately of the secondary sensor S.

What is claimed is:

1. A collision detection system for detecting a collision of a vehicle, comprising:
a plurality of primary sensors for outputting primary signals individually when pressed as a result of a collision of said vehicle;
a secondary sensor for outputting a secondary signal after said primary sensors when pressed as a result of said collision, said plurality of primary sensors being more sensitive than said secondary sensor; and
a control unit connected to said plurality of primary sensors and to said secondary sensor for detecting said collision based on said plurality of primary signals and said secondary signal, said control unit actuating a device loaded on said vehicle when said collision is detected.

2. A collision detection system according to claim 1, wherein said primary sensors and said secondary sensor are arranged in a side door at a side of a vehicle body.

3. A collision detection system according to claim 1, wherein said control unit outputs a collision detection signal when said collision is detected.

4. A collision detection system according to claim 2, wherein said primary sensors and said secondary sensor are attached to a side door beam which is arranged in an vicinity of the inner face of an outer plate in said side door for receiving a collision load at a time of a side collision.

5. A collision detection system according to claim 2, wherein said primary sensors and said secondary sensor are attached to a dent beam which is arranged in an vicinity of the inner face of an outer plate in said side door for preventing said outer plate from being deformed.

6. A collision detection system according to claim 2, wherein said primary sensors are positioned closer to an inner surface of an outer plate in said side door than said secondary sensor.

7. A collision detection system according to claim 6, wherein said primary sensors and said secondary sensor individually include pressure sensitive sensors for detecting a collision if pressed to predetermined or higher levels.

8. A collision detection system according to claim 6, wherein said primary sensors and said secondary sensor individually include touch sensors for detecting a collision if crushed to have their individual contacts connected.

9. A collision detection system according to claim 8, wherein said primary sensors and said secondary sensor are individually formed into thin rectangular pipes individually having contacts on their opposed inner faces.

10. A collision detection system according to claim 1, wherein said secondary sensor is elongated, and wherein said primary sensors are attached at a predetermined interval to that side of said secondary sensor, which is positioned outer with respect to the vehicle body.

11. A collision detection system according to claim 1, wherein said primary sensors and said secondary sensor are spaced from each other.

12. A collision detection system according to claim 4, wherein said side door beam is made circular in cross-section.

13. A collision detection system according to claim 4, wherein said side door beam is shaped into an H-letter in cross-section.

14. A collision detection system for detecting a collision of a vehicle, comprising:
a plurality of collision sensors arranged close to each other in a portion of a vehicle body, to which a collision load is applied at an initial stage of a collision, for outputting a respective plurality of signals when pressed; and a control unit connected to said plurality of collision sensors for detecting said collision when at least a first and a second of said plurality of collision sensors, which are separated by at least a third collision sensor, output said respective signals individually, said control unit failing to detect said collision when only two adjacent ones of said plurality of collision sensors output said respective signals individually, said control unit actuating a device loaded on said vehicle when said collision is detected.

15. A collision detection system according to claim 14, wherein said collision sensors are arranged in a side door at a side of a vehicle body.

16. A collision detection system according to claim 14, wherein said collision sensors are attached to a side door beam which is arranged in a vicinity of an inner face of an outer plate in said side door for receiving a collision load at a time of a side collision.

17. A collision detection system according to claim 14, wherein said collision sensors include touch sensors for detecting a collision if crushed to have their individual contacts connected.

18. A collision detection system according to claim 14, wherein said control unit includes a decision circuit for deciding whether or not an impact comes from a collision from the combination of the collision sensors having outputted their signals.

19. A collision detection system according to claim 14, wherein said control unit outputs a collision detection signal when said collision is detected.

* * * * *